United States Patent
Bhandarkar et al.

(10) Patent No.: US 6,442,977 B1
(45) Date of Patent: Sep. 3, 2002

(54) SOL-GEL PROCESS FOR FABRICATING GERMANIUM-DOPED SILICA ARTICLE

(75) Inventors: Suhas Bhandarkar, Glen Gardner; Frank J McNally, Princeton; Thomas M Putvinski, Scotch Plains, all of NJ (US)

(73) Assignee: Fitel USA Corp., Norcross, GA (US)

( * ) Notice: Subject to any disclaimer, the term of this patent is extended or adjusted under 35 U.S.C. 154(b) by 94 days.

(21) Appl. No.: 09/597,138

(22) Filed: Jun. 20, 2000

(51) Int. Cl.[7] .............................................. C03B 37/016
(52) U.S. Cl. ........................ 65/395; 65/17.2; 65/398; 65/399; 65/378; 65/901; 501/12; 501/37; 501/42; 423/92; 423/93; 423/618
(58) Field of Search .................... 65/17.2, 398, 399, 65/395, 378, 901; 501/12, 42, 37; 423/92, 93, 618

(56) References Cited

U.S. PATENT DOCUMENTS

| | | | |
|---|---|---|---|
| 4,217,027 A | | 8/1980 | MacChesney et al. |
| 4,262,035 A | | 4/1981 | Jaeger et al. |
| 4,419,115 A | * | 12/1983 | Johnson, Jr. et al. .......... 65/399 |
| 4,477,580 A | * | 10/1984 | Fleming, Jr. .................. 65/901 |
| 4,561,872 A | * | 12/1985 | Luong et al. .................. 65/395 |
| 4,574,063 A | * | 3/1986 | Scherer ........................ 65/395 |
| 4,680,048 A | | 7/1987 | Motoki et al. .................. 65/17 |
| 4,775,401 A | | 10/1988 | Fleming et al. |
| 4,909,816 A | | 3/1990 | MacChesney et al. |
| 5,240,488 A | | 8/1993 | Chandross et al. |
| 5,254,508 A | * | 10/1993 | Kirkbir et al. ................. 65/395 |
| 5,344,475 A | | 9/1994 | Bhandarkar et al. |
| 5,356,447 A | | 10/1994 | Bhandarkar |
| 5,944,866 A | | 8/1999 | Chen et al. |

FOREIGN PATENT DOCUMENTS

| | | | | |
|---|---|---|---|---|
| EP | 129625 | * | 1/1985 | ................ 65/901 |
| EP | 0974557 A1 | | 7/1999 | |
| GB | 2127399 | * | 4/1984 | ................ 65/901 |
| GB | 2165234 A | | 4/1986 | |
| SU | 1472448 | * | 4/1989 | |

OTHER PUBLICATIONS

Richard Lewis, Hawley's Condensed Chemical Dictionary, 12th Edition, p. 559.*
Database WPI, Section Ch, Week 198941, Derwent Publications Ltd., London, GB: Class E32, AN 1989–299607, XP002170470 * abstract *.
Patent Abstracts of Japan, vol. 1996, No. 01, Jan. 31, 1996 & JP 07 242419 A (Mitsuibishi Materials Corp), Sep. 19, 1995 * abstract *.
European Search Report dated Mar. 16, 2000 for Application No. 01300295.1.

* cited by examiner

Primary Examiner—Michael Colaianni
(74) Attorney, Agent, or Firm—Peter V.D. Wilde

(57) ABSTRACT

A sol-gel process for fabricating bulk, germanium-doped silica bodies useful for a variety of applications, including core rods, substrate tubes, immediate overcladding, pumped fiber lasers, and planar waveguides, is provided. The process involves the steps of providing a dispersion of silica particles in an aqueous quaternary ammonium germanate solution—typically tetramethylammonium germanate, gelling the dispersion to provide a gel body, and drying, heat treating, and sintering the body to provide the germanium-doped silica glass.

18 Claims, 1 Drawing Sheet

SOL-GEL PROCESS FOR FABRICATING GERMANIUM-DOPED SILICA ARTICLE

BACKGROUND OF THE INVENTION

1. Field of the Invention

The invention relates to sol-gel processing methods for forming silica-based articles.

2. Discussion of the Related Art

Optical transmission fiber typically contains a high-purity silica glass core optionally doped with a refractive index-raising element such as germanium, an inner cladding of high-purity silica glass optionally doped with a refractive index-lowering element such as fluorine, and an outer cladding of undoped silica glass. In some manufacturing processes, the preforms for making such fiber are fabricated by forming an overcladding tube for the outer cladding, and separately forming a rod containing the core material and inner cladding material. The core/inner cladding are fabricated by any of a variety of vapor deposition methods known to those skilled in the art, including vapor axial deposition (VAD), outside vapor deposition (OVD), and modified chemical vapor deposition (MCVD). MCVD is discussed in co-assigned U.S. Pat. Nos. 4,217,027; 4,262,035; and 4,909,816. MCVD involves passing a high-purity gas, e.g., a mixture of gases containing silicon and germanium, through the interior of a silica tube (known as the substrate tube) while heating the outside of the tube with a traversing oxy-hydrogen torch. In the heated area of the tube, a gas phase reaction occurs that deposits particles on the tube wall. This deposit, which forms ahead of the torch, is sintered as the torch passes over it. The process is repeated in successive passes until the requisite quantity of silica and/or germanium-doped silica is deposited. Once deposition is complete, the body is heated to collapse the substrate tube and obtain a consolidated core rod in which the substrate tube constitutes the outer portion of the inner cladding material. To obtain a finished preform, the overcladding tube is typically placed over the core rod, and the components are heated and collapsed into a solid, consolidated preform. It is possible to sinter a porous overcladding tube while collapsing it onto a core rod, as described in co-assigned U.S. Pat. No. 4,775,401.

Because the outer cladding of a fiber is distant from transmitted light, the overcladding glass generally does not have to meet the optical performance specifications to which the core and the inner cladding must conform. For this reason, efforts to both ease and speed manufacture of fiber preforms have focused on methods of making overcladding tubes. One area of such efforts is the use of a sol-gel casting process. Co-assigned U.S. Pat. No. 5,240,488 discloses a sol-gel process capable of producing crack-free overcladding preform tubes of a kilogram or larger. In this process, a colloidal silica dispersion, e.g., fumed silica, is obtained having a pH of 2 to 4. To obtain adequate stability of the dispersion and prevent agglomeration, the pH is raised to a value of about 10 to about 14 by use of a base. Typically, a commercially-obtained dispersion is pre-stabilized at such a pH value by addition of a base such as tetramethylammonium hydroxide (TMAH). Introduction of the TMAH raises the pH value. Other quaternary ammonium hydroxides behave similarly. When the pH is so raised, the silica takes on a negative surface charge due to ionization of silanol groups present on the surface, in accordance with the following reaction:

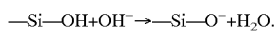

The negative charge of the silica particles creates mutual repulsion, preventing substantial agglomeration and maintaining the stability of the dispersion. In this state, the zeta potential of the particles is at a negative value. (Zeta potential is the potential across the diffuse layer of ions surrounding a charged colloidal particle, and is typically measured from electrophoretic mobilities—the rate at which colloidal particles travel between charged electrodes placed in a solution. See, e.g., C. J. Brinker and G. W. Scherer, *Sol-Gel Science*, Academic Press, 242–243.)

At a later stage in the process, as discussed in Col. 15, lines 39–65 of the '488 patent, a gelling agent such as methyl formate is added to reduce the pH. It is possible to use other esters, as well. The ester reacts to neutralize base, and the negative character of the silica particles is neutralized according to the following reaction:

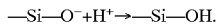

A sufficient amount of the ester must be introduced to neutralize the silica to a degree where gelation is induced. (Gelation, as used herein, indicates that the colloidal silica particles have formed a three-dimensional network with some interstitial liquid, such that the dispersion becomes essentially non-flowing, e.g., exhibiting solid-like behavior, at room temperature.) Subsequent to gelation, the sol-gel body is typically released from its mold, and placed in an oven for drying, heat treatment, and sintering, as reflected in the Table at Cols. 11–12 of the '488 patent.

As the capabilities of such sol-gel techniques have improved and expanded, there has been an increasing desire to utilize sol-gel methods for more aspects of the optical fiber fabrication process as well as to apply sol-gel to other optical applications. Processes for doing so would be desirable.

SUMMARY OF THE INVENTION

The invention provides a sol-gel process for fabricating bulk, germanium-doped silica bodies useful for a variety of applications, including core rods, substrate tubes, immediate overcladding, pumped fiber lasers, and planar waveguides. The process involves the steps of providing a dispersion of silica particles in an aqueous quaternary ammonium germanate solution typically tetramethylammonium germanate, gelling the dispersion to provide a gel body, and drying, heat treating, and sintering the body to provide the germanium-doped silica glass.

The step of providing the dispersion typically involves obtaining hexagonal germanium dioxide powder, mixing the germanium dioxide powder with an aqueous solution of quaternary ammonium hydroxide to provide the quaternary ammonium germanate solution, and mixing the silica with the quaternary ammonium germanate solution. (As used herein, quaternary ammonium germanate solution indicates the result of mixing germanium oxide with an aqueous quaternary ammonium hydroxide solution.) The step of gelling the dispersion typically involves adding a second base to the dispersion—which raises the isoelectric point, aging the dispersion, and then adding a conventional gelling agent to reduce the pH to induce gelation. (The isoelectric point is the point on the pH scale where the zeta potential is zero, as discussed in C. J. Brinker and G. W. Scherer, *Sol-Gel Science*, supra. Gelling agent indicates a material capable of inducing gelation of a silica dispersion.)

The process has numerous benefits. For example, the process enables fabrication of an entire fiber preform by sol-gel techniques. In fact, formation of a Ge-doped core rod by the sol-gel technique is expected to be easier than conventional techniques such as MCVD. The sol-gel bodies also retain more of the germanium than such conventional techniques. In fact, the sol-gel bodies of the invention tend to retain at least 80% of the germanium introduced into the gel body (the remainder lost during, e.g., heat treatment and sintering). This makes the process more efficient and also provides a way to readily provide the high doping levels required by some applications, e.g., multimode fibers used for LAN/WAN applications. It is also possible according to the invention to fabricate germanium-doped silica bodies in a variety of shapes and sizes, including films or even powders, simply by casting the gel in an appropriate configuration.

In addition, it was found that commercially available germanium dioxide, which is marketed as being hexagonal, actually contains a small amount of tetragonal germanium dioxide. This tetragonal germanium dioxide is insoluble in the quaternary ammonium hydroxide solution and is thus undesirable in the process of the invention. Applicants discovered a process, however, for forming essentially 100% hexagonal germanium dioxide, by a technique that is actually much simpler than the conventional method. Specifically, the conventional method involves hydrolysis of germanium tetrachloride with aqueous ammonia. (See, e.g., F. Glocking, *The Chemistry of Germanium*, Academic Press, 35 (1969).) By contrast, according to an aspect of the invention, the hexagonal germanium dioxide is provided by a process involving steps of adding germanium tetrachloride to a large excess of deionized water, advantageously under vigorous stirring, such that germanium dioxide precipitates out. (Large excess indicates a volume ratio of water to germanium tetrachloride of at least 3:1, and typically 3:1 to 10:1.) The precipitate is then washed and dried to provide essentially 100% hexagonal polycrystalline germanium dioxide, i.e., x-ray diffraction indicates the presence of only the hexagonal form. (It is possible, though unlikely, that some amorphous germanium dioxide is present, since the amorphous material is not detectable by x-ray diffraction and is soluble in the quaternary ammonium hydroxide solution.) This formation process facilitates successful fabrication of the germanium-doped silica bodies of the invention.

DETAILED DESCRIPTION OF THE INVENTION

Figure 1:
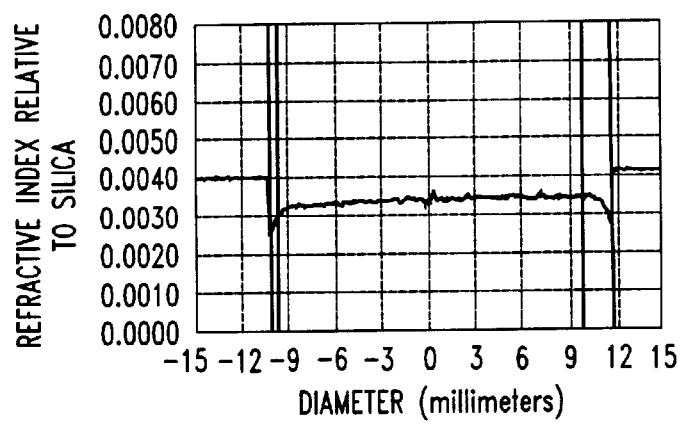
FIG. 1 shows the refractive index profile of a germanium-doped silica body according to an embodiment of the invention.

In one embodiment of the invention, a germanium-doped silica body is formed as follows.

Hexagonal germanium dioxide is fabricated by slowly adding germanium tetrachloride to a large excess of deionized water while vigorously stirring the mixture to induce precipitation of germanium dioxide. The reaction is highly exothermic, and thus the slow addition of the germanium tetrachloride is important. The precipitated germanium dioxide is removed by filtration, upon cooling the mixture to room temperature. The precipitate is then washed, to remove HCl, by either (a) mixing the precipitate with deionized water while vigorously stirring, and then refiltering, or (b) washing the precipitate on the filter several times with deionized water. The powder is then dried at a temperature ranging from about room temperature (25° C.) to about 100° C. The resulting germanium dioxide is essentially 100% hexagonal polycrystalline germanium dioxide, i.e., x-ray diffraction indicates the presence of only the hexagonal form, although it is possible for some amorphous material, which would not register in an x-ray diffraction measurement, to be present. The amorphous material is not detrimental to the process, because both the amorphous and hexagonal forms are soluble in the quaternary ammonium hydroxide solution. In fact, it is possible to use such amorphous germanium dioxide in the invention, but the amorphous form is expensive to attain commercially.

An aqueous quaternary ammonium germanate solution is provided by dissolving the hexagonal germanium dioxide in an aqueous quaternary ammonium hydroxide solution. Typically, the quaternary ammonium hydroxide is a tetraalkylammonium hydroxide, where the alkyl is methyl, ethyl, propyl, or butyl. More typically, the quaternary ammonium hydroxide solution is an aqueous tetramethylammonium hydroxide (TMAH) solution, which upon mixing with the hexagonal germanium dioxide, forms a tetramethylammonium germanate (TMAGe) solution. (TMAH and TMAGe are used below to describe an advantageous embodiment, but it is possible to use the other quaternary ammonium hydroxides to attain the associated quaternary ammonium germanate solution.)

In an advantageous embodiment, the germanium dioxide is added to an aqueous solution comprising 25 wt. % TMAH, using sufficient germanium dioxide to result in a solution comprising 33 wt. % germanium dioxide. The actual roles of the tetramethyl ammonium and the germanium in the TMAGe solution is not known, but the function of the solution in the overall process of the invention is clear from the discussion herein. Use of germanium oxide that is not 100% hexagonal (or hexagonal and amorphous) will lead to a cloudy solution due to the presence of tetragonal germanium dioxide, which is insoluble. The presence of the tetragonal germanium dioxide tends to reduce the homogeneity of the final product, and is thus undesirable. It is theoretically possible to remove the tetragonal material from the dispersion, but such removal would be extremely difficult.

Silica is then added to the TMAGe solution. The overall dispersion typically contains about 20 to about 70 wt. % silica, with the surface area of the silica generally ranging from 5 to 200 m²/g.

To attain a silica dispersion having desired characteristics, e.g., stability, viscosity, pH, it is sometimes necessary to have TMA present in a specified range. (See, e.g., co-assigned U.S. patent application Ser. No. 09/365,191 (our reference Alonzo 1-15-9-56).) Yet, with additional TMA comes additional germanium. Thus, depending on the desired doping levels of germanium, in some cases it is desirable to add further TMAH or further TMAH-stabilized silica to the mixture. Subject to these considerations, the amount of TMAGe is typically adjusted depending on the desired level of doping. The TMAGe is generally present in an amount ranging from 3 to 20 wt. %. Subsequent to addition of the silica, adjustment of the TMAGe content, if any, and/or addition of further TMAH or TMAH-stabilized silica, the stabilized dispersion generally has a pH greater than 10. The resultant dispersion is highly stable, exhibits relatively low viscosity, and maintains this relatively low viscosity even when exposed to low to moderate shear. rates, e.g., upon being pumped or mixed. The dispersion also tends to maintain these properties for at least 6 months, typically longer.

It is possible to include other additives in the dispersion, e.g., polymeric additives or binders, such as discussed in U.S. Pat. No. 5,240,488, referenced above.

Typically, the dispersion is centrifuged to removal agglomerates and/or particulate contaminants. See, e.g., co-assigned U.S. Pat. No. 5,344,475.

The dispersion is then gelled and cast into the desired shape. The gelation technique differs from that of the '488 patent, discussed above. Specifically, a second base (in addition to the TMAGe, which acts as a stabilizing base in the dispersion) is generally added prior to gelation. The second base is generally a material that raises the isoelectric point (IEP) of the dispersion, and thus the gel point. (As noted above, the isoelectric point is the point on the pH scale where the zeta potential is zero, as discussed in C. J. Brinker and G. W. Scherer, *Sol-Gel Science*, supra. The gel point is typically about 1 to 2 pH units higher than the isoelectric point. Specifically, as the pH approaches the IEP, the zeta potential, and thus the mutual repulsion, of the particles diminishes to the point where ordinary thermal energy, i.e., Brownian motion, is able to break through the repulsive barrier such that gelation begins.) Suitable materials include ammonium hydroxide, primary amines, secondary amines, tertiary amines, or compounds containing a combination of primary, secondary, and/or tertiary amines (examples of the latter combination including N,N'-bis(2-aminoethyl) piperazine and N,N'-bis-(3-aminopropyl) piperazine). Examples of useful second base compounds include diethylenetriamine, hexamethylenediamine, and tris(2-aminoethyl)amine.

The amount of the second base added depends on the compound's particular effect. A small amount of some compounds has an effect equivalent to several times more of another compound. In addition, the properties of the gel depend largely on the particular IEP-modifying compound used. Use of compounds to adjust IEP is discussed, for example, in co-assigned U.S. Pat. No. 5,944,866. Selection of the IEP-modifying compound also depends on whether one desires to cast or extrude the resultant gel. Extrusion of the germanium-doped silica gel of the invention is contemplated, in addition to casting, depending on the particular configuration of the desired article.

Once the second base is added, the dispersion is generally allowed to age for a short time, e.g., less than 1 hour. A conventional gelling agent is then added to reduce the pH to the gel point. The gelling agent is typically a water-soluble liquid that undergoes hydrolysis to consume base, e.g., an ester, amide, or halide, and thereby lowers the pH. Useful gelling agents include methyl acetate, methyl lactate, and ethyl lactate. Optionally, the pH is maintained at about 10.5 or higher throughout gelation. There are two basic ways to maintain such a pH. First, the amount of gelling agent is selected and controlled such that the agent does not cause the pH to fall below a desired value. Second, it is contemplated to use a gelling agent that provides a buffering mechanism to maintain the pH of the dispersion at a desired value or higher. Other gelling agents which have been found to be useful include N-(2-hydroxyethyl) trichloroacetamide, N-(2-hydroxyethyl) trifluoroacetamide, N-N'-[di(2-hydroxyethyl)] trifluoroacetamide, 1-chloro-2-propanol, glyceryl monoisobutyrate, methyl 2-hydroxyisobutyrate, ethyl 2-hydroxyisobutyrate, methyl isobutyrate, N-(2-hydroxyethyl) succinimide, 2-hydroxyethyl methacrylate, and 2-hydroxypropyl methacrylate.

After adding the gelling agent, the dispersion is typically transferred into a mold or an extruder, where it is allowed to gel. Gelling typically occurs over a time period of about 15 minutes to about 20 hours. Where the gel body is molded, the gel is then typically allowed to age in the mold for about 5 to 48 hours. For extrusion, the gel generally ages for a few hours or less. Aging provides a desirable rearrangement of particles, leading to better packing, expulsion of some liquid around the particles, and associated shrinkage of the gel in the mold—a process known as syneresis. Syneresis adds strength and, due to the shrinkage, eases removal from a mold. Once aged, the gel is released from the mold, or extruded into the desired shape. The gel is then dried, typically under relatively moderate conditions, e.g., temperature less than 25° C. and relative humidity greater than 50%. As the drying rate slows, the humidity is generally lowered to allow continued drying. Drying is generally stopped when about 2 to 3 weight percent water remains in the body—the remaining water is removed by subsequent treatment steps.

Heat treatment of the body is then performed. (As used herein, heat treatment includes any number or combination of steps that provide removal of water, organic materials, metal contaminants, and/or other undesired elements.) Typically, the body is heated to temperatures of 25 to 400° C. to initiate water removal and begin removal of organics. Air is generally introduced as the temperature is raised to 250 to 400° C. to oxidize remaining organics. Metal contaminants are generally removed by exposure to a chlorine-containing atmosphere at temperatures of 400 to 1000° C. An additional air treatment is generally performed to remove chlorine from the body, and the body is then cooled in nitrogen, and kept in a dry atmosphere until sintering is performed. Useful treatments are reflected in the examples below. Alternative treatments that provide sufficient removal of undesired materials are also possible. See, e.g., co-assigned U.S. Pat. No. 5,356,447 and co-assigned U.S. patent application Ser. No. 09/109,827. As noted in the gelation discussion above, treatments applicable to silica bodies are not necessarily directly applicable to the germanium-doped silica bodies of the invention. Control experiments are easily performed to determine the level of applicability of such treatments to the germanium-doped bodies of the invention.

In one aspect of the invention, a radially-varying refractive index profile is provided by a step of treating the body in thionyl chloride, typically by flowing thionyl chloride and nitrogen over the body at elevated temperatures. The thionyl chloride was found to etch some germanium from the body, and because the effect of the thionyl chloride is dependent on the extent to which it is able to diffuse into the body, the extent of germanium etch is capable of being controlled. This effect is reflected in Example 3 below.

After the heat treatment, the body is sintered. Typically, the body is heated to a temperature of at least 1100° C. to eliminate the porosity. It is possible to remove remaining chlorine during the ramp up to the sintering temperature, by introducing oxygen. Typically, the last stages of sintering are performed in helium to reduce the trapping of gases not able to diffuse out of the body. A useful sintering regime is reflected in the examples below.

The resultant sintered body typically exhibits an index of refraction indicating a retention of about 80% of the germanium. It appears that the other 20% is removed during sintering (in the absence of a step such as a thionyl chloride treatment that is intended to remove some germanium). The germanium appears to simply precipitate or deposit in the body upon burnout of other additives, providing the desired doping of the silica body.

The germanium-doped silica bodies of the invention are homogeneous crack-free bodies, with no discoloration and very low water content. It is possible, according to the invention to fabricate relatively large bodies having these characteristics, e.g., greater than 1 kg.

The bodies are useful for a variety of applications, including core rods, substrate tubes, tubes for immediate claddings, pumped fiber lasers, planar waveguides, grating structures, and even silicon/germanium sputtering targets. For core rods, it is expected to be advantageous to use fine silica particles, to reduce or avoid segregation during the high temperatures encountered in drawing fiber. Germanium-doped overcladding tubes are not generally necessary for standard fiber, but are of interest for some complex fiber designs. As for sputtering targets, current targets are much less homogeneous than bodies made according to the invention, and targets made according to the invention would thus be expected to improve the overall sputtering process. The relatively thick, e.g., a few microns, layers required for planar waveguides and planar grating structures are readily formed according to the invention.

One particular fiber that would benefit from the process of the invention is multimode fiber for LAN/WAN (local area network and wide area network) applications. Such fiber requires a relative high amount of germanium doping that can in some cases be difficult or expensive to achieve with conventional techniques.

As discussed above, it is also possible to fabricate bodies having a graded germanium distribution, e.g., a graded refractive index. One technique, discussed above, is to etch some of the germanium from the exterior of the body to provide a gradient. It is also possible to perform a layered deposition of dispersions having varying amounts of germanium, for either planar or fiber applications. Such so-called free form fabrication techniques are capable of being applied to the invention, based on the guidelines provided herein. Free form fabrication is discussed, for example in H. Marcus et al., "Solid Freeform Fabrication: An Overview," IMECE Symposium on Rapid Response Manufacturing, ASME manufacturing Division, November, 1996; and S. Kang et al., "Fabrication of high quality ceramic parts using Mold SDM," *Proc. Solid Freeform Fabrication Symposium*, 427–434, University of Texas at Austin, August 1999.

The invention will be further clarified by the following examples, which are intended to be exemplary.

EXAMPLE 1

A germanium-doped silica body was fabricated by the following process.

Germanium dioxide was fabricated by slowly adding germanium tetrachloride to a large excess of deionized water, about 500 g germanium tetrachloride to about 2500 ml of water, while vigorously stirring the mixture. The precipitated germanium dioxide was removed by filtration after the mixture was cooled to room temperature. The precipitate was washed to remove HCl by adding the precipitate to deionized water while vigorously stirring, and then refiltering the material. The powder was dried at less than 100° C.

The germanium dioxide powder was added to an aqueous solution of 25 wt. % TMAH, in an amount sufficient to provide a mixture with 33 wt. % germanium dioxide. The mixture was stirred until the powder was completely dissolved, with no visible particulates, to provide a TMAGe solution. Fumed silica (OX-50 obtained from Degussa-Huls) was slowly added into a disperser containing the TMAGe solution and deionized water while mixing under high shear. Upon completion of the silica addition, the resulting mixture consisted of 20 parts silica, 3.0 parts TMAGe solution, and 8.7 parts water, by weight. After an hour of mixing subsequent to the final silica addition, deionized water and TMAGe solution was added to provide a final composition of 9 wt. % TMAGe solution, 55 wt. % silica, and the balance water.

This dispersion was centrifuged for 15 minutes, and decanted, with the centrate then used for casting. To the dispersion was added 0.59 wt. % tris(2-aminoethyl)amine, and the dispersion was then allowed to age for 30 minutes. Methyl acetate was added, in an amount of 2.4 wt. %, and the mixture was agitated for about 30 seconds. The resultant mixture was poured into a tubular mold having a diameter of 2 cm and a length of 25 cm, and deaired by exposure to a vacuum for 5 minutes. The mold was covered and the gel was aged for about 24 hours.

After launching the body from the mold, the body was placed into a humidity-controlled drying chamber with a flowing nitrogen atmosphere. The temperature and humidity was taken from about 65% relative humidity and 25° C. to about 5% relative humidity and 25° C., as drying progressed. Drying continued until the body contained about 2 to 3 wt. % water. The body was transferred to a furnace and the temperature of the body was ramped from 25° C. to 350° C. in flowing nitrogen. The nitrogen was replaced by air, and the temperature was ramped up to 650° C., where the body was held while flowing air and thionyl chloride through the furnace, followed by treatment in air at the same temperature. Sintering was performed by heating the body up to 1000° C. in a dry nitrogen atmosphere. Nitrogen was replaced by dry air and the temperature was ramped up to 1100° C. for two hours. The body was held at that temperature for two more hours in a helium atmosphere, at which time the temperature was ramped up to 1400° C. The body was cooled in helium down to 1100° C. and then cooled in the ambient atmosphere thereafter.

The resultant doped silica glass was homogeneous and crack-free, exhibited no visible discoloration, and had a water content of less than 1 ppm.

FIG. 1 shows the refractive index profile of the body, with the y-axis showing the refractive index difference from pure silica. A higher index oil is present at the exterior of the body. The profile shows a uniform distribution of germanium throughout the body, and also shows that approximately 80% of the introduced germanium was retained.

EXAMPLE 2

The procedure of Example 1 was followed, using a dispersion containing 3 wt. % TMAGe solution. This solution was provided by diluting the 9 wt. % dispersion of Example 1 with an undoped silica dispersion containing 55 wt. % silica, 1.5 wt. % TMAH, and the balance water. Specifically, one part of the 9 wt. % dispersion was mixed with 2 parts of the undoped dispersion.

Figure 2:
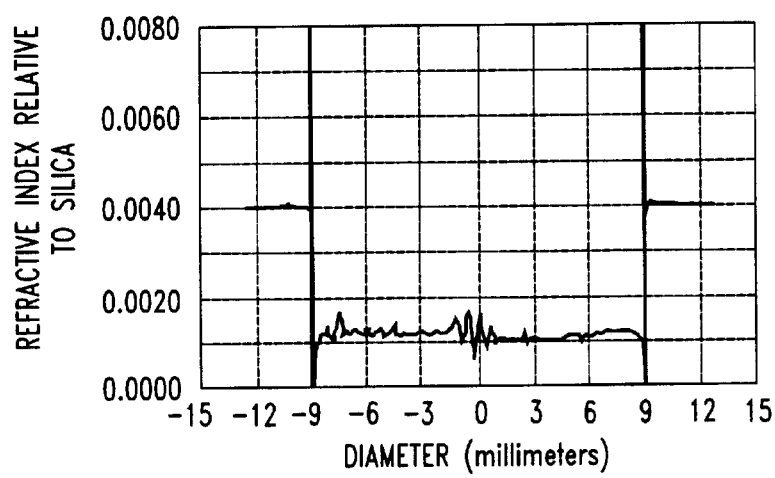
FIG. 2 shows the refractive index profile of a germanium-doped silica body according to another embodiment of the invention.

As shown by the refractive index profile of FIG. 2, the resultant body exhibits an index of refraction about 0.001 greater than that of pure silica. (The y-axis again shows refractive index relative to the index of pure silica.) As in Example 1, the body was homogeneous and crack-free, exhibited no visible discoloration, and had a water content of less than 1 ppm. The profile shows the uniform distribution of germanium throughout the body, and also shows that approximately 80% of the introduced germanium was retained.

EXAMPLE 3

The process of Example 2 was repeated, except that the heat treatment was modified to provide a graded index glass. Specifically, instead of flowing air and thionyl chloride through the furnace while holding the body at 650° C., nitrogen and thionyl chloride were flowed through the furnace at this temperature. This change allowed some etching of germanium from the body.

Figure 3:
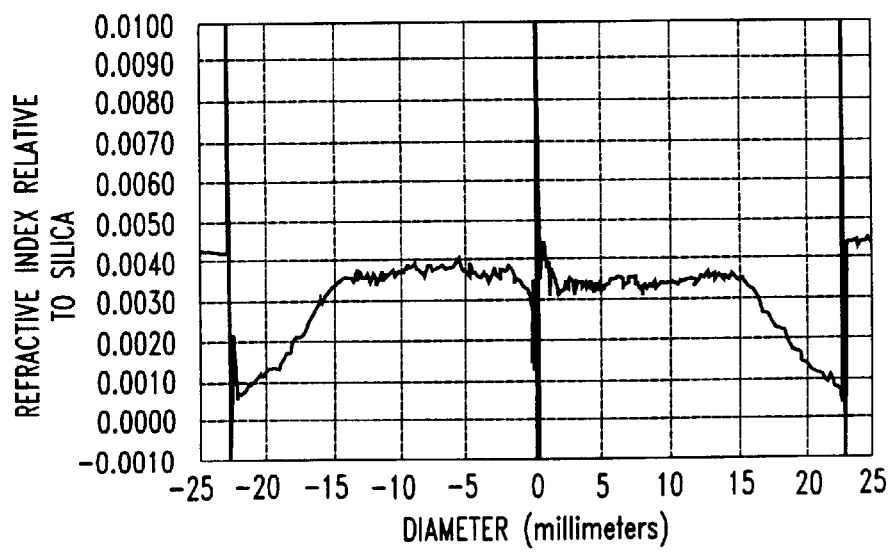
FIG. 3 shows the refractive index profile of a germanium-doped silica body according to a further embodiment of the invention.

The refractive index profile of the resultant body is shown in FIG. 3 (again with the y-axis showing refractive index relative to pure silica). The center of the body contains a level of germanium similar to that of Example 2, with a gradual reduction in index toward the exterior of the rod.

Other embodiments of the invention will be apparent to those skilled in the art from consideration of the specification and practice of the invention disclosed herein.

What is claimed is:

1. A process for fabricating an article, comprising the steps of:
   providing a dispersion of silica particles in an aqueous quaternary ammonium germanate solution;
   gelling the dispersion to provide a gel body;
   and treating the body to provide a sintered germanium-doped silica body.

2. The process of claim 1, wherein the step of providing the dispersion comprises:
   obtaining germanium dioxide powder;
   mixing the germanium dioxide powder with an aqueous quaternary ammonium hydroxide solution to provide the quaternary ammonium germanate solution; and
   mixing the silica with the quaternary ammonium germanate solution.

3. The process of claim 2, wherein the germanium dioxide is essentially 100% hexagonal.

4. The process of claim 1, wherein the quaternary ammonium germanate solution is a tetraalkylammonium germanate solution, where the alkyl is at least one group selected from the group consisting of methyl, ethyl, propyl, and butyl.

5. The process of claim 4, wherein the alkyl is methyl.

6. The process of claim 2, wherein the quaternary ammonium hydroxide solution is a tetraalkylammonium hydroxide solution, where the alkyl is at least one group selected from the group consisting of methyl, ethyl, propyl, and butyl.

7. The process of claim 1, wherein the step of gelling the dispersion comprises:
   adding a second base to the dispersion; and
   adding a gelling agent.

8. The process of claim 7, wherein the second base raises the isoelectric point of the dispersion.

9. The process of claim 8, wherein the second base comprises at least one compound selected from the group consisting of ammonium hydroxide, primary amines, secondary amines, tertiary amines, or compounds containing a combination of primary, secondary, and/or tertiary amines.

10. The process of claim 9, wherein the second base comprises at least one compound selected from the group consisting of N,N'-bis(2-aminoethyl) piperazine, N,N'-bis-(3-aminopropyl) piperazine), diethylenetriamine, hexamethylenediamine, and tris(2-aminoethyl)amine.

11. The process of claim 2, wherein the germanium dioxide powder is fabricated by a process comprising the steps of:
   mixing water and germanium tetrachloride water in a $H_2O:GeCl_4$ volume ratio of 3:1 to 10:1 while stirring the mixture, such that germanium dioxide precipitates out of the mixture; and
   washing and drying the precipitate, such that the resultant germanium dioxide powder is essentially 100% hexagonal.

12. The process of claim 1, wherein, prior to gelation, the dispersion has a pH greater than 10.

13. The process of claim 1, wherein the treating step comprises steps of drying, heat treating, and sintering the gel body.

14. The process of claim 13, wherein the heat treating step comprises exposing the gel body to thionyl chloride such that germanium is etched from the body.

15. The process of claim 1, wherein the sintered germanium-doped silica body retains at least 80% of the germanium present in the germanate solution.

16. The process of claim 1, wherein the sintered germanium-doped silica body is greater than 1 kg.

17. The process of claim 1, wherein the sintered germanium-doped silica body exhibits a graded germanium distribution.

18. The process of claim 1, wherein the sintered germanium-doped silica body is a core rod, a substrate tube, a tube for an immediate cladding, a pumped fiber laser, a planar waveguide, a grating structure, or a silicon/germanium sputtering target.

* * * * *